United States Patent
Lin et al.

(10) Patent No.: US 8,527,804 B2
(45) Date of Patent: Sep. 3, 2013

(54) ARCHITECTURE AND METHOD FOR ELIMINATING STORE BUFFERS IN A DSP/PROCESSOR WITH MULTIPLE MEMORY ACCESSES

(75) Inventors: Jentsung Ken Lin, San Diego, CA (US); Ajay Anant Ingle, Austin, TX (US); Eai-hsin A. Kuo, San Diego, CA (US); Paul Douglas Bassett, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/916,661

(22) Filed: Nov. 1, 2010

(65) Prior Publication Data

US 2012/0110367 A1 May 3, 2012

(51) Int. Cl.
*G06F 5/06* (2006.01)
*G06F 13/00* (2006.01)

(52) U.S. Cl.
USPC ........... 713/601; 713/400; 713/401; 713/600; 711/100; 711/150; 711/154; 711/167

(58) Field of Classification Search
USPC ................. 713/400, 401, 600, 601; 711/100, 711/150, 154, 167
See application file for complete search history.

(56) References Cited

U.S. PATENT DOCUMENTS

| | | | |
|---|---|---|---|
| 5,884,060 A | 3/1999 | Vegesna et al. | |
| 6,622,235 B1 * | 9/2003 | Keller et al. | 712/23 |
| 6,915,390 B2 | 7/2005 | Arimilli et al. | |
| 7,143,247 B1 * | 11/2006 | Grossier | 711/154 |
| 7,266,674 B2 | 9/2007 | Carrie | |
| 7,502,917 B2 | 3/2009 | Arimilli et al. | |
| 2008/0148021 A1 * | 6/2008 | DeMent et al. | 712/214 |
| 2008/0270763 A1 * | 10/2008 | Sheffer et al. | 712/220 |
| 2008/0276079 A1 * | 11/2008 | Luick | 712/234 |
| 2009/0006818 A1 | 1/2009 | Luick | |

FOREIGN PATENT DOCUMENTS

EP  0992891 A1  4/2000

OTHER PUBLICATIONS

International Search Report and Written Opinion—PCT/US2011/058824—ISA/EPO—Jan. 25, 2012.

* cited by examiner

*Primary Examiner* — Vincent Tran
(74) *Attorney, Agent, or Firm* — Peter Michael Kamarchik; Nicholas J. Pauley; Joseph Agusta

(57) ABSTRACT

A method and apparatus for controlling system access to a memory that includes receiving first and second instructions, and evaluating whether both instructions can architecturally complete. When at least one instruction cannot architecturally complete, delaying both instructions. When both instructions can architecturally complete and at least one is a write instruction, adjusting a write control of the memory to account for an evaluation delay. The evaluation delay can be sufficient to evaluate whether both instructions can architecturally complete. The evaluation delay can be input to the write control and not the read control of the memory. A precharge clock of the memory can be adjusted to account for the evaluation delay. Evaluating whether both instructions can architecturally complete can include determining whether data for each instruction is located in a cache, and whether the instructions are memory access instructions.

21 Claims, 4 Drawing Sheets

ARCHITECTURE AND METHOD FOR ELIMINATING STORE BUFFERS IN A DSP/PROCESSOR WITH MULTIPLE MEMORY ACCESSES

FIELD OF DISCLOSURE

The present disclosure relates generally to processors, and more particularly to an architecture and method for eliminating store buffers in a processor with multiple memory accesses.

BACKGROUND

The need for faster processing of data and data operations has been a driving force behind the improvements seen in the field of data processing systems. Improvements have lead to the development of faster, smaller, and more complex processors and digital signal processors (DSPs), including those that implement parallel processing, pipelining and/or very long instruction word (VLIW) processing, as well as multiprocessor configurations and distributed memory systems.

Parallel processing can increase the overall speed of a processor by enabling it to execute multiple instructions at the same time. In some cases, to increase the number of instructions being processed and thus increase speed, the processor may be pipelined. Pipelining refers to providing separate stages in a processor where each stage performs one or more of the small steps necessary to execute an instruction. Parallel processing and pipelining can lead to architectural dependencies and timing issues as multiple instructions attempt to execute and access memory or other circuitry simultaneously.

Processors typically provide load and store instructions to access information located in the caches and/or main memory. A load instruction may include a memory address (in the instruction or an address register) and a target register. When the load instruction is executed, data stored at the memory address may be retrieved (e.g., from cache, main memory, or other storage means) and placed in the target register identified in the load instruction. Similarly, a store instruction may include a memory address and a source register. When the store instruction is executed, data from the source register may be written to the memory address identified in the store instruction.

Very long instruction word (VLIW) processors and DSPs execute a group of instructions belonging to the same packet. Each packet includes multiple slots. The processor starts processing the next packet when all of the instructions in the slots of the current packet complete execution. If the execution of any instruction in the packet is delayed, then none of the other instructions in the packet can complete. If the execution takes multiple cycles or stalls due to hazards, the architectural state is not updated until all instructions in the packet complete. The architectural state of a processor includes the states of its registers, caches, memory management unit (MMU), main memory, etc.

A VLIW packet may contain multiple memory access instructions, for example multiple load instructions, multiple store instructions or a combination of load and store instructions. The data may be cached to improve performance. However, even if one of the instructions in the packet can complete, it must not do so until all of the other instructions in the packet can also complete. This produces cross-instruction or cross-slot dependencies for architectural updates within the VLIW packet. For example, if a packet contains a load instruction and a store instruction, there can be architectural and timing path dependencies between a cache hit event for the load instruction and a write enable event for the store instruction. The write enable event would be delayed if the load instruction did not have a cache hit (data for the load instruction stored in the cache). Note that if a VLIW packet contains two store operations, the cross slot architectural dependency affects write enables of the store instructions in both slots.

These architectural dependencies and timing issues of multiple memory accesses can be resolved by different methods. One method is to temporarily store update data in a store buffer during a memory access conflict or cross slot dependency, and updating the cache with the data from the store buffer after the memory conflict is resolved or after knowing the other slot(s) can complete. If the store buffer is sized appropriately, it can make it easier to handle memory bank conflicts and late pipeline cancellations, and provide some speed/frequency improvement. However, the separate store buffer requires additional area and introduces complexity to manage data dependencies (content addressable memory (CAM) structures), data buffering (depth) needs, age of data in the store buffer and address ordering. Note that the area of the store buffer goes up with the number of stores supported in a VLIW packet, so the store buffer solution may not be cost efficient in terms of power, area and complexity. Another method is to reduce the clock frequency/speed of the pipeline to allow dependency resolution prior to the memory stage and relax timing issues. However, this results in a performance loss that directly impacts the clock frequency of the whole processor, increases the load/read latency and can make it harder to handle memory bank conflicts. Yet another method is to use separate read and write wordline clocks where the wordline gets an early clock for load access and a late clock for store access. However, the separate read and write wordline clocks increases the complexity of memory array timing verification for reads and writes, and makes it harder to handle memory bank conflicts.

It would be desirable to have an architecture and method for handling multiple memory accesses in a processor, including digital signal processors (DSPs), without a store buffer that retains the frequency benefits of the pipeline, has little impact on processor speed when there are multiple memory operations and avoids some of the other drawbacks of prior methods.

SUMMARY

A method for controlling system access to a memory is disclosed that includes receiving a first processor instruction and a second processor instruction, and evaluating whether the first and second processor instructions can architecturally complete. If at least one of the first and second processor instructions cannot architecturally complete, then delaying both the first and second processor instructions. If both of the first and second processor instructions can architecturally complete and at least one of the first and second processor instructions is a write instruction, then adjusting a write control of the memory to account for an evaluation delay.

The evaluation delay can be a sufficient time to evaluate whether the first and second processor instructions can architecturally complete. The evaluation delay can be accounted for in the write column select for the memory. When either of the first or second processor instruction is a read instruction, a read control of the memory does not account for the evaluation delay. When both of the first and second processor instructions can architecturally complete and at least one of the first and second processor instructions is a write instruction, a precharge clock of the memory can be adjusted to account for the evaluation delay.

When both of the first and second processor instructions can architecturally complete and at least one of the first and second processor instructions is a memory access instruction, the method can also include sending a non-delayed clock signal not accounting for the evaluation delay to a read control of the memory, sending a delayed clock signal accounting for the evaluation delay to the write control of the memory, sending both the non-delayed clock signal and the delayed clock signal to a precharge clock multiplexer of the memory; and selectively controlling the precharge clock multiplexer to send one of the non-delayed clock signal and the delayed clock signal as a precharge clock signal.

The controlling of the precharge clock can include inputting both the non-delayed clock and the delayed clock to a multiplexer, and inputting the read enable signal into a select input of the multiplexer, so that the multiplexer outputs the non-delayed clock as the precharge clock when the read enable indicates a read instruction, and the multiplexer outputs the delayed clock as the precharge clock when the read enable does not indicate a read instruction.

The evaluating step can include determining whether data for the first and second processor instructions are located in a cache. The evaluating step can also include determining whether the first processor instruction is a memory access instruction and determining whether the second processor instruction is a memory access instruction. The method can also include generating a write enable signal when the first processor instruction is a write instruction and either data for the second processor instruction is located in a cache or the second processor instruction is not a memory access instruction.

A memory access controller is disclosed that includes a first slot for processing a first instruction, a second slot for processing a second instruction, system combinational logic generating signals indicating whether both the first and second instructions can architecturally complete, and a delay circuit for adjusting a write control of a memory to account for a delay of the signals generated by the system combinational logic. The memory access controller can be incorporated into a device selected from a group consisting of a music player, a video player, an entertainment unit, a navigation device, a communications device, a personal digital assistant (PDA), a fixed location data unit, and a computer.

The memory access controller can also include first and second cache memories and first and second cache hit signals. The first cache hit signal indicates whether data for the first instruction is stored in the first cache, and the second cache hit signal indicates whether data for the second instruction is stored in the second cache. The system combinational logic using both the first and second cache hit signals.

The system combinational logic can include first and second slot combinational logic. The first slot combinational logic receives the second cache hit signal and generates a store enable signal for the first instruction, the first slot combinational logic. The second slot combinational logic receives the first cache hit signal and generates a store enable signal for the second instruction. The first slot combinational logic can also receive a first instruction store signal indicating whether the first instruction is a store instruction and a second instruction no-dependency signal indicating whether the second instruction is a memory access instruction. The first slot combinational logic can generate the store enable signal for the first instruction when the first instruction store signal indicates that the first instruction is a store instruction and either the second cache hit signal indicates that the data for the second instruction is in the second cache or the second instruction no-dependency signal indicates that the second instruction is not a memory access instruction. The second slot combinational logic can also receive a second instruction store signal indicating whether the second instruction is a store instruction and a first instruction no-dependency signal indicating whether the first instruction is a memory access instruction. The second slot combinational logic can generate the store enable signal for the second instruction when the second instruction store signal indicates that the second instruction is a store instruction and either the first cache hit signal indicates that the data for the first instruction is in the first cache or the first instruction no-dependency signal indicates that the first instruction is not a memory access instruction.

The memory access controller can also include a data array having load logic and store logic. The load logic can receive the first cache hit signal and the second cache hit signal, and when one of the first and second cache hit signals indicates a location in the data array, the load logic can generate a word line signal indicating the location in the data array. The store logic can receive the store enable signal for the first instruction and the store enable signal for the second instruction, and when one of the store enable signals for the first and second instructions indicates a location in the data array, the store logic can generate a write chip select signal indicating the location in the data array.

When any of the first and second instructions is a write instruction, the system combinational logic can generate a write enable signal when both the first and second instructions can architecturally complete. When a write enable signal is generated, the delay circuit can delay the write control of the memory by approximately the same amount of time as it takes for the system combinational logic to generate the write enable signal.

The memory access controller can also include a write column select and a read column select for the memory. The delay circuit can adjust the write column select of the memory to account for the delay of the signals generated by the system combinational logic and does not have to adjust the read column select of the memory to account for the delay of the signals generated by the system combinational logic. The memory access controller can also include a multiplexer having a first input, a second input, an output and a select line. The first input can be coupled to a non-delayed clock not delayed by the delay circuit, the second input can be coupled to a delayed clock delayed by the delay circuit, the output can generate a precharge clock, and the select line can be coupled to a read enable signal, so that the multiplexer passes the non-delayed clock to the output when the read enable indicates a read instruction and passes the delayed clock to the output when the read enable does not indicate a read instruction.

A memory access controller is disclosed that includes a first means for processing a first instruction, a second means for processing a second instruction, computational means for generating signals indicating whether both the first and second instructions can architecturally complete, and delay means for adjusting a write control of a memory to account for a delay of the signals generated by the computational means.

For a more complete understanding of the present disclosure, reference is now made to the following detailed description and the accompanying drawings.

DETAILED DESCRIPTION

The present invention describes an architecture and method for retaining the frequency benefits of the pipeline without the need of a store buffer and not affecting the processor operational speed when there are multiple memory operations.

Figure 1:
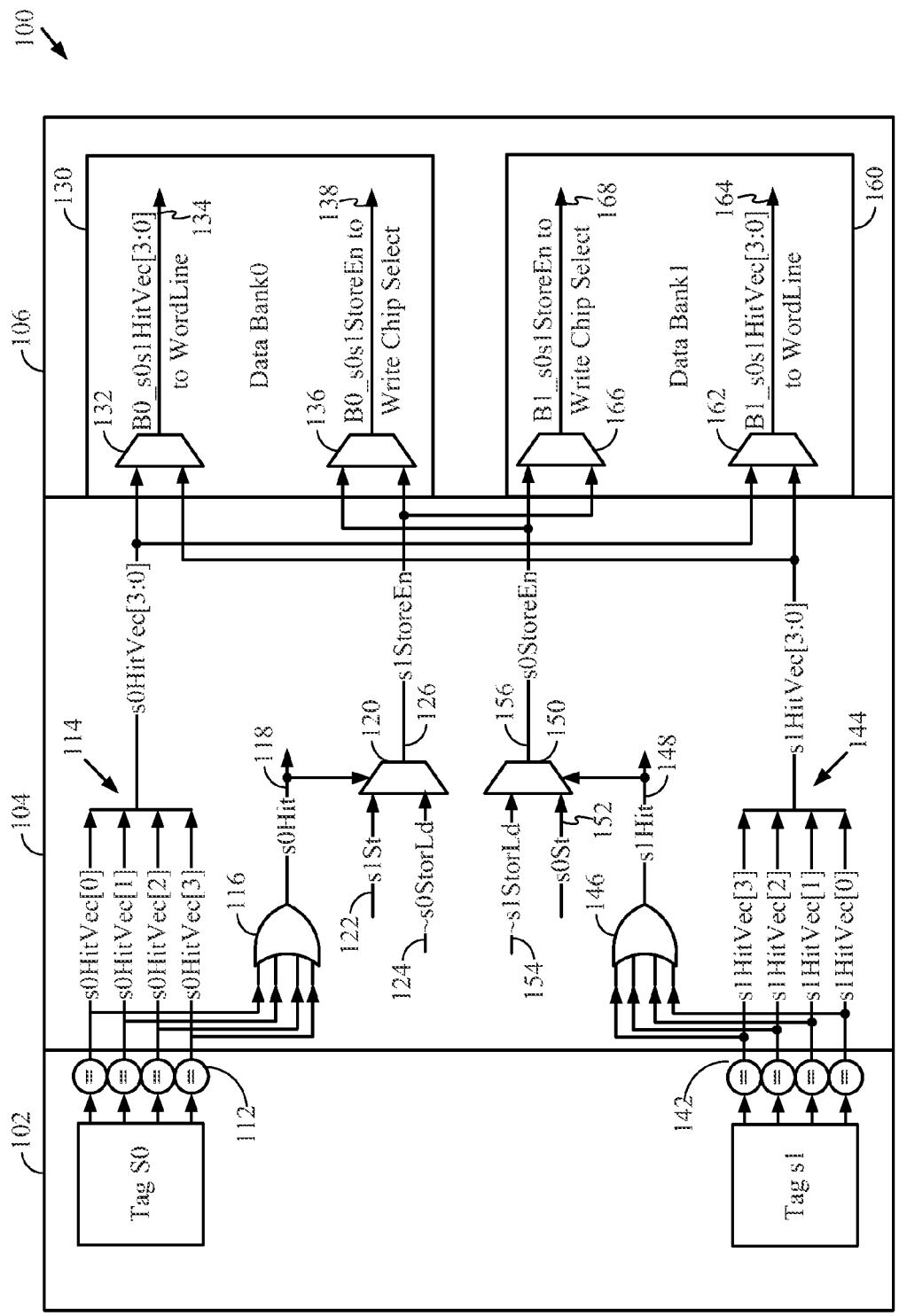
FIG. 1 is a circuit diagram showing an exemplary multiple memory access system with cross-slot dependency circuitry.

FIG. 1 shows a circuit diagram of an exemplary architecture for a system 100 that can handle the architectural dependency of multiple memory accesses without the use of a store buffer. The system 100 is a Very Long Instruction Word (VLIW) system which exemplifies the multiple memory access issues. The system 100 includes tag array section 102, cross-slot dependency circuitry 104 and data array section 106. For clarity, FIG. 1 shows two tag arrays for two slots in the tag array section 102 and two data arrays in the data array section 106; however the system can include any number of M tag arrays for M slots in the tag array section 102 and N data arrays in the data array section 106.

The tag array section 102 includes tags for a slot s0 and a slot s1. If the slot s0 holds a memory access instruction, the system checks if the data is stored in a four way s0 cache 112. The four way s0 cache 112 is only an example of a type of cache that may be used. For example, the cache 112 could be a direct mapped cache or have a number of ways X, where X is 2 or more. If the data is in the s0 cache 112, a cache hit occurs and one of the elements of an s0 hit vector 114 will indicate the location of the data in the s0 cache 112. If none of the elements of an s0 hit vector 114 indicates the location of the data, then the data is not in the s0 cache 112 and a cache miss occurs. The elements of the s0 hit vector 114 are input to an OR reduction gate 116 which outputs an s0 hit signal 118. If any of the elements of the s0 hit vector 114 indicates a cache hit, then the s0 hit signal 118 will indicate a cache hit for the slot s0. If none of the elements of the s0 hit vector 114 indicates a cache hit, then the s0 hit signal 118 will indicate a cache miss for the slot s0. If the slot s0 is a memory access instruction and there is not a hit in the s0 cache 112, then the system retrieves the necessary data from memory and puts it into the s0 cache 112 at which point the s0 hit vector 114 and the s0 hit signal 118 will indicate a cache hit for the slot s0.

The tag array section 102 also includes a tag for the slot s1. If the slot s1 holds a memory access instruction, the system checks if the data is stored in a four way s1 cache 142. The s1 cache 142 can be of any desired type and size. If the data is in the s1 cache 142, a cache hit occurs and one of the elements of an s1 hit vector 144 will indicate the location of the data in the s1 cache 142. If none of the elements of an s1 hit vector 144 indicates the location of the data, then the data is not in the s1 cache 142 and a cache miss occurs. The elements of the s1 hit vector 144 are input to an OR reduction gate 146 which outputs an s1 hit signal 148. If any of the elements of the s1 hit vector 144 indicates a cache hit, then the s1 hit signal 148 will indicate a cache hit for the slot s1. If none of the elements of the s1 hit vector 144 indicates a cache hit, then the s1 hit signal 148 will indicate a cache miss for the slot s1. If the slot s1 is a memory access instruction and there is not a hit in the s1 cache 142, then the system retrieves the necessary data from memory and puts it into the s1 cache 142 at which point the s1 hit vector 144 and the s1 hit signal 148 will indicate a cache hit for the slot s1.

S1 combinational logic 120 determines cross-slot dependencies and whether an s1 store enable signal 126 should be sent to data arrays 130 and 160. The s1 store enable signal 126 indicates that the slot s1 is a store instruction and the cross-slot dependencies have been resolved so that the store instruction in the slot s1 can execute and store data. The combinational logic 120 receives several inputs including: the s0 hit signal 118; an s1 store instruction signal 122, and an s0 no-dependency signal 124. The s0 hit signal 118 indicates whether the instruction in the slot s0 has data available in the s0 cache 112. When there are more than two slots, a hit signal for each of the slots will be input to the combinational logic, except for the hit signal of the slot for which the store enable signal is being determined. The s1 store instruction signal 122 indicates whether the slot s1 holds a store instruction. The s0 no-dependency signal 124 indicates when the instruction in the slot s0 is not a memory access, store or load instruction, and thus no memory access dependency exists with the slot s0. When there are more than two slots, a no-dependency signal for each of the slots will be input to the combinational logic, except for the no-dependency signal of the slot for which the store enable signal is being determined.

The s1 combinational logic 120 sends the s1 store enable signal 126 when the s1 store instruction signal 122 indicates that the slot s1 holds a store instruction, and for each of the other slots either (a) the no-dependency signal, for example the s0 no-dependency signal 124, indicates that the slot s1 does not need to wait for that slot, or (b) the hit signal, for example the s0 hit signal 118, indicates that there was a cache hit for that slot.

S0 combinational logic 150 determines cross-slot dependencies and whether an s0 store enable signal 156 should be sent to the data arrays 130 and 160. The s0 store enable signal 156 indicates that the slot s0 is a store instruction and the cross-slot dependencies have been resolved so that the store instruction in the slot s0 can execute and store data. The combinational logic 150 receives several inputs including: the s1 hit signal 148; an s0 store instruction signal 152, and an s1 no-dependency signal 154. The s1 hit signal 148 indicates whether the instruction in the slot s1 has data available in the s1 cache 142. The s0 store instruction signal 152 indicates whether the slot s0 holds a store instruction. The s1 no-dependency signal 154 indicates when the instruction in the slot s1 is not a memory access, store or load instruction, and thus no memory access dependency exists with the slot s1.

The s0 combinational logic 150 sends the s0 store enable signal 156 when the s0 store instruction signal 152 indicates that the slot s0 holds a store instruction, and for each of the other slots either (a) the no-dependency signal, for example the s1 no-dependency signal 154, indicates that the slot s0 does not need to wait for that slot, or (b) the hit signal, for example the s1 hit signal 148, indicates that there was a cache hit for that slot.

The s0 hit vector 114, the s0 store enable signal 156, the s1 hit vector 144, and the s1 store enable signal 126 are sent to each of the data arrays 130, 160. A system that processes a packet with M slots and uses N data arrays would send a hit vector and store enable signal for each of the M slots to each of the N data arrays.

The data array 130 includes load multiplexer 132 and store multiplexer 136. The load multiplexer 132 receives the hit vectors for each of the slots; in this case the s0 hit vector 114 and the s1 hit vector 144. If any of the hit vectors indicates that the location for a load instruction is in the data array 130, then the load multiplexer 132 activates a word line 134 for the data array 130. The store multiplexer 136 receives the store enable signals for each of the slots; in this case the s0 store enable 156 and the s1 store enable 126. If any of the store enable signals indicates that the location for a store instruction is in the data array 130, then the store multiplexer 136 activates a write chip select signal 138 for the data array 130.

The data array 160 includes load multiplexer 162 and store multiplexer 166. The load multiplexer 162 receives the hit vectors for each of the slots; in this case the s0 hit vector 114 and the s1 hit vector 144. If any of the hit vectors indicates that the location for a load instruction is in the data array 160, then the load multiplexer 162 activates a word line 164 for the data array 160. The store multiplexer 166 receives the store enable signals for each of the slots; in this case the s0 store enable 156 and the s1 store enable 126. If any of the store enable signals indicates that the location for a store instruction is in the data array 160, then the store multiplexer 166 activates a write chip select signal 168 for the data array 160.

In the embodiment shown in FIG. 1, each of the data banks 130, 160 is single ported; thus only one slot can do a load or a store to a particular data bank at one time. The select signals for the load and store multiplexers of each of the data banks can be used to determine the order of the slots access to the data banks. The select signals for the load and store multiplexers 132, 136 of the data array 130, and for the load and store multiplexers 162, 166 of the data array 160 can be determined via bits from the slot address and the slot read or write access enable to the data bank. If both slots want to do a load or a store to the same data array, then one of the slots can access the data array on a replay. If the slots want to do a load or a store to different data arrays, then the accesses to the different data arrays can occur in parallel.

The data banks can be organized so they are addressed using set bits that are a slice of the memory access address. The banks can be selected by set bits called bank selector bits. The wordline of a bank can be addressed through a hit way vector and some additional set bits, and the column can be addressed through some remaining set bits. This organization allows for low power operation of the banks and also allows for the store enable to be an independently controlled signal from the wordline control. This organization gives the ability of a load or store instruction to cancel itself through its hit way vector (for example, hit vector 114 or 144) while allowing the store enable (for example, store enable signal 126 or 156) to be controlled by another parameter, for example the hit signal from another slot. However, for single ported memory banks, if multiple memory access instructions target the same data bank, then the memory access instructions will be selected to proceed one at a time.

Other factors can also be added to the store enable that are related to memory management unit (MMU) attributes or some form of cache allocation schemes. Since the store enable is independently controlled architecturally from the wordline control, the store enable can arrive late to allow more complete qualification to be added to the store enable; for example cross slot dependencies of hit signals to achieve an atomic update of the processor architectural state. The hit signal (for example, hit signal 118 or 148) is a late arriving signal since it ORs the hit vector to a one bit hit signal. This hit signal is further qualified by opcode decode bits of the other slots in the packet and then AND-ed with the opcode decode bits of the store operation in the current slot to generate the store enable signal for the current slot (for example, store enable signal 126 or 156). However there is a balance in that the store enable signal cannot be so late that the write is not able to complete during the cycle. A delay circuit can maintain the balance at a very low cost of power, area and complexity. This can be done by overlapping the cross slot logic computations for the write enable signal with a portion of the bank access time for the wordline signal.

Figure 2:
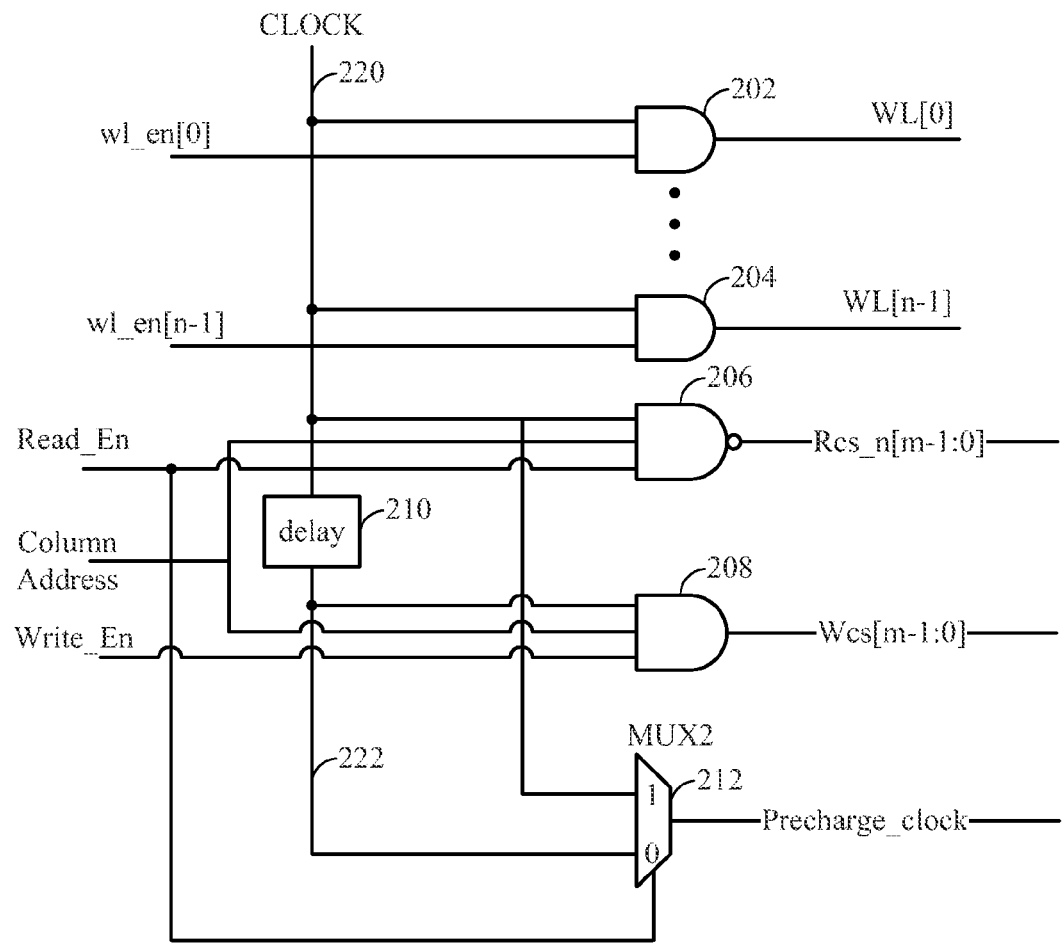
FIG. 2 is a circuit diagram showing exemplary control logic within a data bank with delays for write control and precharge clock.

The processing described above to generate the store enable signals 126, 156 using the OR reduction gates 116, 146 and the combinational logic 120, 150 incurs a processing delay. FIG. 2 shows exemplary circuitry to allow the data banks to absorb this processing delay. Inputs to the circuitry shown in FIG. 2 include a clock signal 220, wordline enable signals, column address lines, read enable signal, and write enable signal. The wordline enable signals are the output of the row decoder circuit whose input can be the hit vector and some portion of the set bits. The column address can be formed from a portion of the set bits not used in the row decoder. The write enable signal can be one of the two store enable signals 126, 156 selected based on the order of the memory access that is allowed to proceed within the data bank.

The wordline enable signals, indicating the location where data is to be read from or written to, are input to n AND gates along with the clock signal 220. The clock signal 220 activates the n AND gates and the location is passed to N word lines. Two AND gates 202, 204 of the n AND gates for the n word lines are shown in FIG. 2. The word lines 134, 164 are examples of the N word lines. The word lines 134, 164 can also be used along with set bits to address a larger row decoder.

The clock signal 220, read enable and column address signals are input to a NAND gate 206 to generate a read column select signal. The clock 220 is then input to a delay circuit 210 to generate a delayed clock 222 used for the write column select signal. The delay circuit 210 accounts for the circuitry delay in generating the store enable signals and relaxes the write enable setup constraint. The delayed clock 222, write enable and column address signals are input to an AND gate 208 to generate a write column select signal. The write chip select signals 138, 168 are examples of write column select signals. For the embodiment shown in FIG. 1, the delay circuit 210 accounts for the delay of the OR reduction gates 116, 146, the combinational logic 120, 150 and other circuitry in generating the store enable signals 126, 156. The delay circuit may introduce additional delay in order to provide operation margin. The delay can be tailored to the implementation for generating the write enable signals. If the delay is too long, then unnecessary power may be used; and if the delay is too short, then the write may fail.

In this embodiment, the wordline and read column select signals are not delayed but the write column select signal is delayed. This is because the write column select must wait for the store/write enable signals 126, 156 to be generated and input to the AND gate 208. The read column select signal is not dependent on the store enable signals and, therefore does not need to be delayed to wait for generation of the store enable signals. Delaying the read column select signal adds to the read latency of the system.

A multiplexer 212 is used to control the precharge clock to ensure that the system waits for the bit lines to recharge after a preceding memory access operation. The non-delayed clock signal 220 and the delayed clock signal 222 are input to the multiplexer 212 and the read enable signal is input to the select line of the multiplexer 212. When the read enable signal is active, the non-delayed clock signal 220 is output as the precharge clock and when the read enable signal is not-active, the delayed clock signal 222 is output as the precharge clock.

The delayed write and precharge clocks avoids a write failure due to a mismatch between the wordline rise and the write column select.

Figure 3:
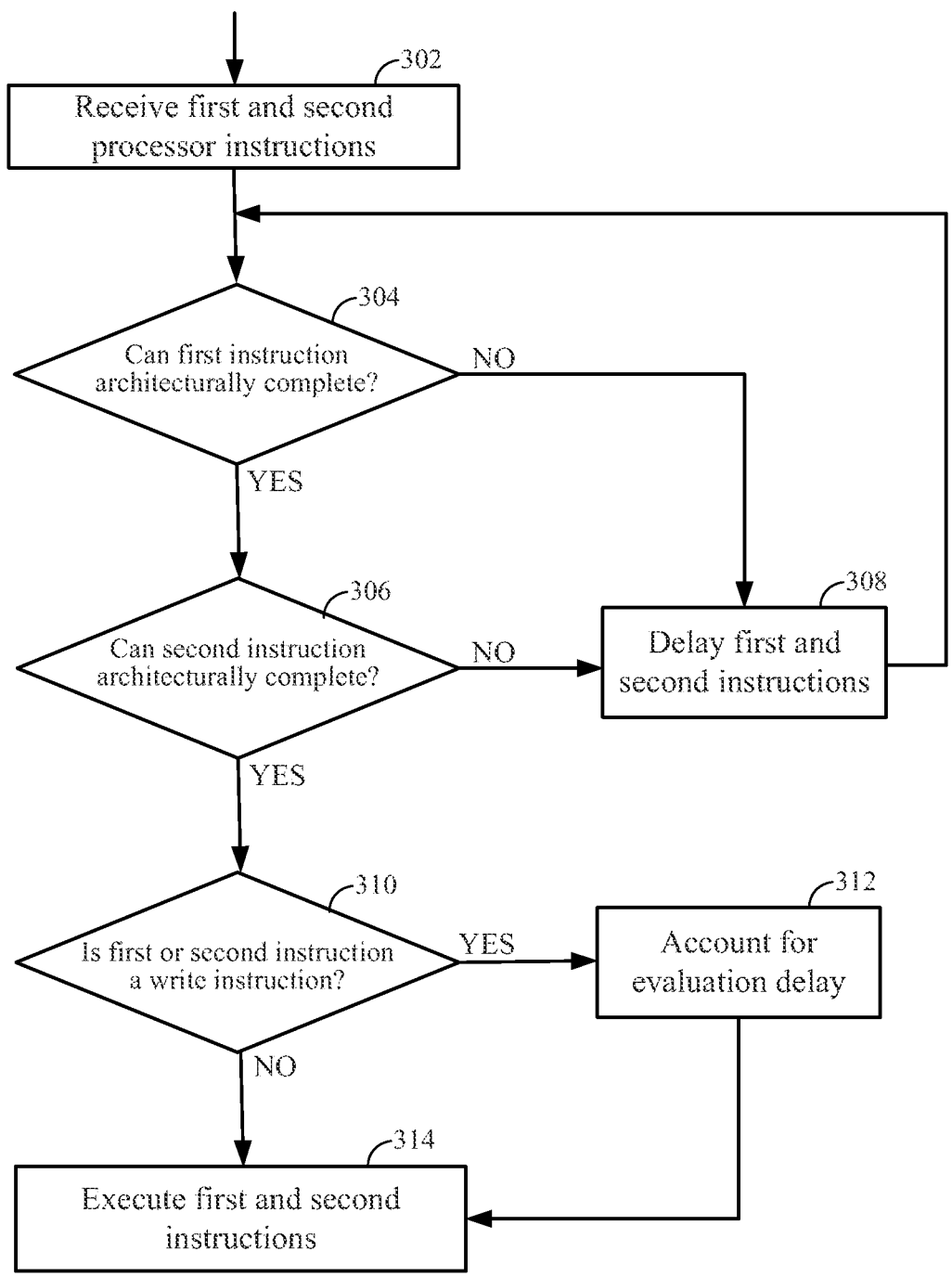
FIG. 3 is a flow diagram showing an exemplary method for controlling a multiple memory access system.

FIG. 3 shows a flow diagram for an exemplary method of controlling system access to a memory. At block 302 the system receives first and second processor instructions. There can be more than two processor instructions received at the same time, and one of skill in the art will understand how the method can be expanded to handle more than two processor instructions.

At block 304, the system evaluates whether the first processor instruction can architecturally complete and, at block 306, the system evaluates whether the second processor instruction can architecturally complete. The flow diagram shows blocks 304 and 306 occurring sequentially, but these evaluations can occur in parallel, by a circuit such as the one shown in FIG. 1, to reduce the required evaluation time. If the evaluations in blocks 304 and 306 determine that one of the instructions cannot architecturally complete, then at block 308 both instructions are delayed and execution does not continue until both instructions can architecturally complete. When both the first and second instructions can architecturally complete, control is transferred to block 310.

At block 310, the system determines whether either of the first and second processor instructions is a write/store instruction. If either of the first and second processor instructions is a write/store instruction, then control is transferred to block 312. Otherwise, control is transferred to block 314 where the first and second processor instructions are executed.

At block 312, the evaluation delay in generating the write enable signals is accounted for. In the exemplary embodiment of FIG. 1, this includes the circuit delay in generating the store enable signals 126 and 156. The exemplary embodiment of FIG. 2 shows this evaluation delay as the delay circuit 210. Accounting for the delay in block 312, control is transferred to block 314 where the first and second processor instructions are executed.

Figure 4:
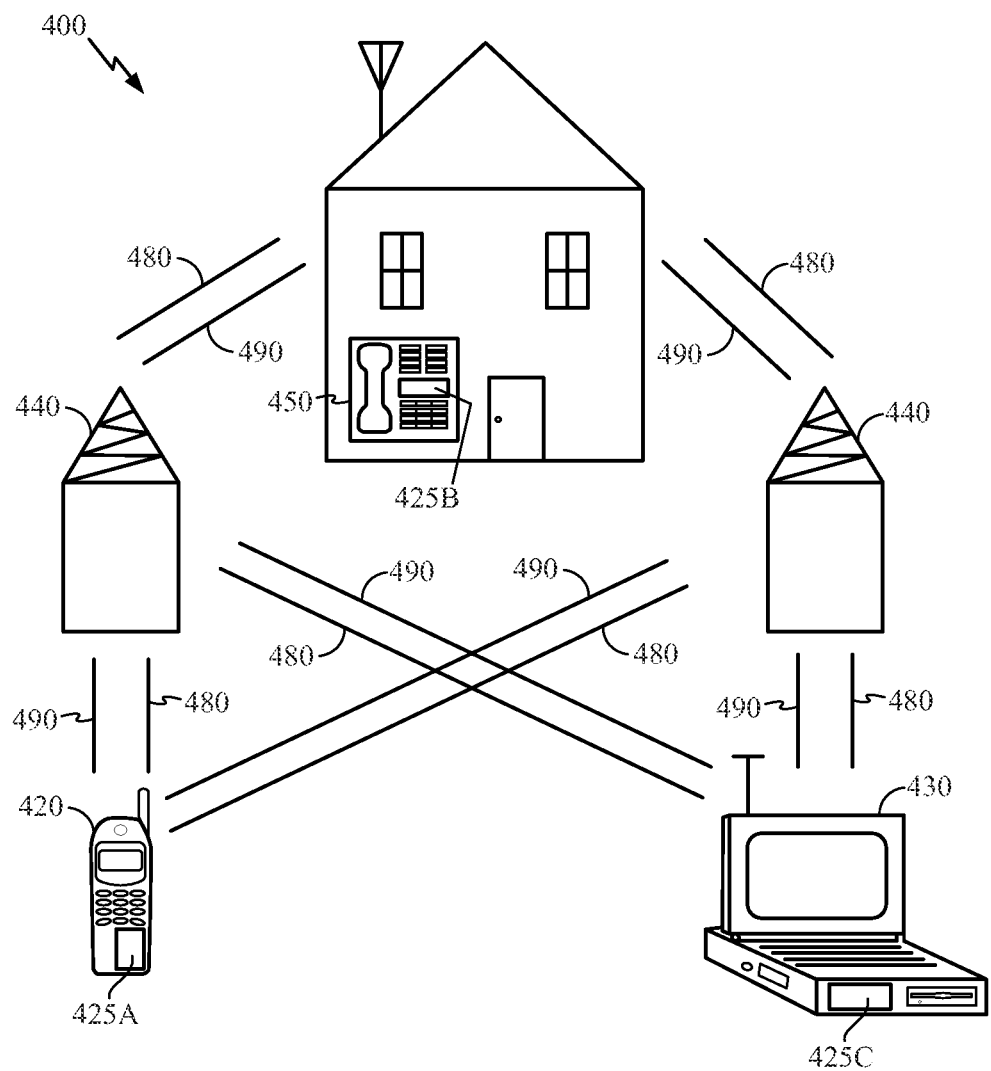
FIG. 4 is a block diagram showing an exemplary wireless communication system in which an embodiment of an architecture and method to eliminate store buffers in a processor with multiple memory accesses may be advantageously employed.

FIG. 4 shows an exemplary wireless communication system 400 in which an embodiment of an architecture and method to eliminate store buffers in a processor with multiple memory accesses may be advantageously employed. For purposes of illustration, FIG. 4 shows three remote units 420, 430, and 450 and two base stations 440. It should be recognized that typical wireless communication systems may have many more remote units and base stations. Any of the remote units 420, 430, and 450 may include the architecture and method to eliminate store buffers in a processor with multiple memory accesses as disclosed herein. FIG. 4 shows forward link signals 480 from the base stations 440 and the remote units 420, 430, and 450 and reverse link signals 390 from the remote units 420, 430, and 450 to base stations 440.

In FIG. 4, remote unit 420 is shown as a mobile telephone, remote unit 430 is shown as a portable computer, and remote unit 450 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 4 illustrates certain exemplary remote units that may include the architectures and methods to eliminate store buffers in a processor with multiple memory accesses as disclosed herein, the architectures and methods as disclosed herein are not limited to these exemplary illustrated units. Embodiments may be suitably employed in any electronic device in which processors with multiple memory accesses are desired.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling system access to a memory comprising:
    receiving a first processor instruction and a second processor instruction;
    evaluating whether the first and second processor instructions can architecturally complete;
    when at least one of the first and second processor instructions is a write instruction and cannot architecturally complete, delaying both the first and second processor instructions;
    when both of the first and second processor instructions can architecturally complete and at least one of the first and second processor instructions is a write instruction, adjusting a clock signal of the memory to account for an evaluation delay.

2. The method of claim 1, wherein the evaluation delay is a sufficient time to evaluate whether the first and second processor instructions can architecturally complete.

3. The method of claim 2, wherein the evaluation delay is accounted for in the write column select for the memory.

4. The method of claim 1, wherein when either of the first or second processor instruction is a read instruction, a read control of the memory does not account for the evaluation delay.

5. The method of claim 1, further comprising when both of the first and second processor instructions can architecturally complete and at least one of the first and second processor instructions is a write instruction, adjusting a precharge clock of the memory to account for the evaluation delay.

6. The method of claim 1, further comprising, when both of the first and second processor instructions can architecturally complete and at least one of the first and second processor instructions is a memory access instruction,
    sending a non-delayed clock signal not accounting for the evaluation delay to a read control of the memory,
    sending a delayed clock signal accounting for the evaluation delay to the write control of the memory,
    sending both the non-delayed clock signal and the delayed clock signal to a precharge clock multiplexer of the memory; and
    selectively controlling the precharge clock multiplexer to send one of the non-delayed clock signal and the delayed clock signal as a precharge clock signal.

7. The method of claim 6, wherein the controlling a precharge clock comprises:
    inputting both the non-delayed clock and the delayed clock to a multiplexer; and
    inputting the read enable signal into a select input of the multiplexer;
    wherein the non-delayed clock is output by the multiplexer as the precharge clock when the read enable indicates a read instruction, and the delayed clock is output by the multiplexer as the precharge clock when the read enable does not indicate a read instruction.

8. The method of claim 1, wherein the evaluating step comprises determining whether data for the first and second processor instructions are located in a cache.

9. The method of claim 8, wherein the evaluating step further comprises determining whether the first processor instruction is a memory access instruction and determining whether the second processor instruction is a memory access instruction.

10. The method of claim 1, further comprising generating a write enable signal when the first processor instruction is a write instruction and either data for the second processor instruction is located in a cache or the second processor instruction is not a memory access instruction.

11. A memory access controller comprising:
a first slot for processing a first instruction;
a second slot for processing a second instruction;
system combinational logic generating signals indicating whether both the first and second instructions can architecturally complete; and
a delay circuit for adjusting a write control of a memory to account for a delay of the signals generated by the system combinational logic.

12. The memory access controller of claim 11, further comprising:
a first cache memory;
a first cache hit signal indicating whether data for the first instruction is stored in the first cache;
a second cache memory;
a second cache hit signal indicating whether data for the second instruction is stored in the second cache;
the system combinational logic using both the first and second cache hit signals.

13. The memory access controller of claim 11, wherein the system combinational logic further comprises:
first slot combinational logic receiving the second cache hit signal and generating a store enable signal for the first instruction; and
second slot combinational logic receiving the first cache hit signal and generating a store enable signal for the second instruction.

14. The memory access controller of claim 13, wherein the first slot combinational logic further receives a first instruction store signal indicating whether the first instruction is a store instruction and a second instruction no-dependency signal indicating whether the second instruction is a memory access instruction, and the first slot combinational logic generates the store enable signal for the first instruction when the first instruction store signal indicates the first instruction is a store instruction and either the second cache hit signal indicates that the data for the second instruction is in the second cache or the second instruction no-dependency signal indicates the second instruction is not a memory access instruction; and
the second slot combinational logic further receives a second instruction store signal indicating whether the second instruction is a store instruction and a first instruction no-dependency signal indicating whether the first instruction is a memory access instruction, and the second slot combinational logic generates the store enable signal for the second instruction when the second instruction store signal indicates the second instruction is a store instruction and either the first cache hit signal indicates that the data for the first instruction is in the first cache or the first instruction no-dependency signal indicates the first instruction is not a memory access instruction.

15. The memory access controller of claim 13, further comprising:
a data array having load logic and store logic;
the load logic receiving the first cache hit signal and the second cache hit signal, wherein when one of the first and second cache hit signals indicates a location in the data array, the load logic generates a word line signal indicating the location in the data array;
the store logic receiving the store enable signal for the first instruction and the store enable signal for the second instruction, wherein when one of the store enable signals for the first and second instructions indicates a location in the data array, the store logic generates a write chip select signal indicating the location in the data array.

16. The memory access controller of claim 11, wherein, when any of the first and second instructions is a write instruction, the system combinational logic generates a write enable signal when both the first and second instructions can architecturally complete.

17. The memory access controller of claim 16, wherein, when a write enable signal is generated, the delay circuit delays the write control of the memory by approximately the same amount of time as it takes for the system combinational logic to generate the write enable signal.

18. The memory access controller of claim 11, further comprising a write column select and a read column select for the memory, the delay circuit adjusting the write column select of the memory to account for the delay of the signals generated by the system combinational logic and not adjusting the read column select of the memory to account for the delay of the signals generated by the system combinational logic.

19. The memory access controller of claim 11, further comprising
a multiplexer having a first input, a second input, an output and a select line, the first input being coupled to a non-delayed clock not delayed by the delay circuit, the second input being coupled to a delayed clock delayed by the delay circuit, the output generating a precharge clock, and the select line coupled to a read enable signal;
wherein the multiplexer passes the non-delayed clock to the output when the read enable indicates a read instruction and passes the delayed clock to the output when the read enable does not indicate a read instruction.

20. The memory access controller of claim 11 incorporated into a device selected from a group consisting of a music player, a video player, an entertainment unit, a navigation device, a communications device, a personal digital assistant (PDA), a fixed location data unit, and a computer.

21. A memory access controller comprising:
a first means for processing a first instruction;
a second means for processing a second instruction;
computational means for generating signals indicating whether both the first and second instructions can architecturally complete; and
delay means for adjusting a write control of a memory to account for a delay of the signals generated by the computational means.

* * * * *